US009222702B2

(12) United States Patent
    Goldberg

(10) Patent No.: US 9,222,702 B2
(45) Date of Patent: Dec. 29, 2015

(54) SYSTEMS AND METHODS FOR CONTROL AND CALIBRATION OF A SOLAR POWER TOWER SYSTEM

(71) Applicant: BRIGHTSOURCE INDUSTRIES (ISRAEL) LTD., Jerusalem (IL)

(72) Inventor: Nitzan Goldberg, Jerusalem (IL)

(73) Assignee: BRIGHTSOURCE INDUSTRIES (ISRAEL) LTD., Jerusalem (IL)

( * ) Notice: Subject to any disclaimer, the term of this patent is extended or adjusted under 35 U.S.C. 154(b) by 431 days.

(21) Appl. No.: 13/686,630

(22) Filed: Nov. 27, 2012

(65) Prior Publication Data
    US 2013/0139804 A1    Jun. 6, 2013

Related U.S. Application Data

(60) Provisional application No. 61/565,883, filed on Dec. 1, 2011.

(51) Int. Cl.
    *F24J 2/38* (2014.01)

(52) U.S. Cl.
    CPC .............. *F24J 2/38* (2013.01); *F24J 2002/385* (2013.01); *F24J 2200/04* (2013.01); *Y02E 10/47* (2013.01)

(58) Field of Classification Search
    CPC ............... F24J 2/38; F24J 2/40; F24J 2/542; F24J 2/5424; F24J 2200/04; F24J 2002/385; Y02E 10/41; Y02E 10/47; G01S 3/7861
    See application file for complete search history.

(56) References Cited

U.S. PATENT DOCUMENTS

| 811,274 A | 1/1906 | Carter |
| 2,999,943 A | 9/1961 | Willard |

(Continued)

FOREIGN PATENT DOCUMENTS

| DE | 10248068 | 5/2004 |
| EP | 0106688 | 3/1985 |

(Continued)

OTHER PUBLICATIONS

"Mean and Peak Wind Load Reduction on Heliostats," Colorado State University, Solar Energy Research Institute, U.S. Department of Energy [online], Sep. 1987 [retrieved on May 16, 2012]. Retrieved from the Internet: <URL: http://www.nrel.gov/docs/legosti/old/3212.pdf>.

(Continued)

*Primary Examiner* — Alfred Basichas
(74) *Attorney, Agent, or Firm* — Miles & Stockbridge P.C.; Mark A. Catan

(57) ABSTRACT

A solar energy collection system can include a plurality of heliostats configured to reflect sunlight to a target mounted on a tower. Each of the heliostats can have a heliostat controller configured to control a respective heliostat so that the sunlight reflected therefrom is directed to at least one of a plurality of cameras. The cameras can be oriented to image the heliostat. A second controller can be configured to compute geometry data that defines a geometry of the surface of the heliostat from captured images thereof. The geometry data can designate a plurality of subsections of the surface. The computing by the second controller can include storing data indicating sections of the captured images corresponding to the plurality of subsections of the heliostat. The second controller can also calculate data indicating respective surface normals of each of said subsections of each of said heliostat.

20 Claims, 8 Drawing Sheets

(56) References Cited

U.S. PATENT DOCUMENTS

| | | |
|---|---|---|
| 3,892,433 A | 7/1975 | Blake |
| 3,924,604 A | 12/1975 | Anderson |
| 4,034,735 A | 7/1977 | Waldrip |
| 4,044,753 A | 8/1977 | Fletcher et al. |
| 4,102,326 A | 7/1978 | Sommer |
| 4,117,682 A | 10/1978 | Smith |
| 4,146,785 A | 3/1979 | Neale |
| 4,164,123 A | 8/1979 | Smith |
| 4,172,443 A | 10/1979 | Sommer |
| 4,219,729 A | 8/1980 | Smith |
| 4,227,513 A | 10/1980 | Blake et al. |
| 4,245,618 A | 1/1981 | Wiener |
| 4,247,182 A | 1/1981 | Smith |
| 4,265,223 A | 5/1981 | Miserlis et al. |
| 4,283,887 A | 8/1981 | Horton et al. |
| 4,289,114 A | 9/1981 | Zadiraka |
| 4,297,521 A | 10/1981 | Johnson |
| 4,331,829 A | 5/1982 | Palazzetti et al. |
| 4,343,182 A | 8/1982 | Pompei |
| 4,365,618 A | 12/1982 | Jones |
| 4,438,630 A | 3/1984 | Rowe |
| 4,459,972 A | 7/1984 | Moore |
| 4,474,169 A | 10/1984 | Steutermann |
| 4,485,803 A | 12/1984 | Wiener |
| 4,490,981 A | 1/1985 | Meckler |
| 4,512,336 A | 4/1985 | Wiener |
| 4,564,275 A | 1/1986 | Stone |
| 4,633,854 A | 1/1987 | Mayrhofer |
| 4,773,751 A | 9/1988 | Matsuda et al. |
| 4,913,129 A | 4/1990 | Kelly et al. |
| 5,128,799 A | 7/1992 | Byker |
| 5,417,052 A | 5/1995 | Bharathan et al. |
| 5,578,140 A | 11/1996 | Yogev et al. |
| 5,759,251 A | 6/1998 | Nakamura et al. |
| 5,861,947 A | 1/1999 | Neumann |
| 5,862,799 A | 1/1999 | Yogev et al. |
| 5,899,199 A | 5/1999 | Mills |
| 5,905,590 A | 5/1999 | Van Der Sluis et al. |
| 5,982,481 A | 11/1999 | Stone et al. |
| 6,080,927 A | 6/2000 | Johnson |
| 6,131,565 A | 10/2000 | Mills |
| 6,310,725 B1 | 10/2001 | Duine et al. |
| 6,597,709 B1 | 7/2003 | Diver, Jr. |
| 6,653,551 B2 | 11/2003 | Chen |
| 6,662,801 B2 | 12/2003 | Hayden et al. |
| 6,818,818 B2 | 11/2004 | Bareis |
| 6,899,097 B1 | 5/2005 | Mecham |
| 6,926,440 B2 | 8/2005 | Litwin |
| 6,957,536 B2 | 10/2005 | Litwin et al. |
| 6,959,993 B2 | 11/2005 | Gross et al. |
| 7,042,615 B2 | 5/2006 | Richardson |
| 7,191,597 B2 | 3/2007 | Goldman |
| 7,191,736 B2 | 3/2007 | Goldman |
| 7,207,327 B2 | 4/2007 | Litwin et al. |
| 7,296,410 B2 | 11/2007 | Litwin |
| 7,331,178 B2 | 2/2008 | Goldman |
| 7,340,899 B1 | 3/2008 | Rubak et al. |
| 7,523,921 B2 | 4/2009 | Garrity |
| 7,884,279 B2 | 2/2011 | Dold et al. |
| 8,001,960 B2 | 8/2011 | Gilon et al. |
| 8,033,110 B2 | 10/2011 | Gilon et al. |
| 2004/0025931 A1 | 2/2004 | Aguglia |
| 2004/0086021 A1 | 5/2004 | Litwin |
| 2004/0231716 A1 | 11/2004 | Litwin |
| 2005/0126170 A1 | 6/2005 | Litwin |
| 2007/0084208 A1 | 4/2007 | Goldman |
| 2007/0157614 A1 | 7/2007 | Goldman |
| 2007/0157922 A1 | 7/2007 | Radhakrishnan et al. |
| 2007/0221208 A1 | 9/2007 | Goldman |
| 2007/0272234 A1 | 11/2007 | Allen et al. |
| 2008/0000436 A1 | 1/2008 | Goldman |
| 2008/0011288 A1 | 1/2008 | Olsson |
| 2008/0011290 A1 | 1/2008 | Goldman et al. |
| 2008/0293132 A1 | 11/2008 | Goldman et al. |
| 2008/0295883 A1 | 12/2008 | Ducellier et al. |
| 2008/0314438 A1 | 12/2008 | Tran et al. |
| 2009/0038608 A1 | 2/2009 | Caldwell |
| 2009/0056701 A1 | 3/2009 | Mills et al. |
| 2009/0107485 A1 | 4/2009 | Reznik et al. |
| 2009/0151769 A1 | 6/2009 | Corbin et al. |
| 2009/0178668 A1 | 7/2009 | Boggavarapu |
| 2009/0217921 A1 | 9/2009 | Gilon et al. |
| 2009/0229264 A1 | 9/2009 | Gilon et al. |
| 2009/0241938 A1 | 10/2009 | Arbogast et al. |
| 2009/0250052 A1 | 10/2009 | Gilon et al. |
| 2010/0006087 A1 | 1/2010 | Gilon et al. |
| 2010/0191378 A1 | 7/2010 | Gilon et al. |
| 2010/0236239 A1 | 9/2010 | Kroizer et al. |
| 2010/0263709 A1 | 10/2010 | Norman et al. |
| 2010/0282242 A1 | 11/2010 | Gilon et al. |
| 2010/0300510 A1 | 12/2010 | Goldman et al. |
| 2011/0036343 A1 | 2/2011 | Kroyzer et al. |
| 2011/0088396 A1 | 4/2011 | Katz et al. |
| 2011/0220091 A1 | 9/2011 | Kroyzer |
| 2012/0024282 A1 | 2/2012 | Gilon et al. |

FOREIGN PATENT DOCUMENTS

| | | |
|---|---|---|
| JP | 56-102646 | 8/1981 |
| WO | WO 2004/004016 | 1/2004 |
| WO | WO 2004/067933 | 8/2004 |
| WO | WO 2007/118223 | 10/2007 |
| WO | WO 2008/092194 | 8/2008 |
| WO | WO 2008/092195 | 8/2008 |
| WO | WO 2008/114248 | 9/2008 |
| WO | WO 2008/118980 | 10/2008 |
| WO | WO 2008/128237 | 10/2008 |
| WO | WO 2008/154599 | 12/2008 |
| WO | WO 2009/015219 | 1/2009 |
| WO | WO 2009/015388 | 1/2009 |
| WO | WO 2009/021099 | 2/2009 |
| WO | WO 2009/055624 | 4/2009 |
| WO | WO 2009/070774 | 6/2009 |
| WO | WO 2009/103077 | 8/2009 |
| WO | WO 2009/131787 | 10/2009 |
| WO | WO 2011/064718 | 6/2011 |
| WO | WO 2011/140021 | 11/2011 |
| WO | WO 2012/014153 | 2/2012 |

OTHER PUBLICATIONS

BCB Informatica Y Control, "Heliostat Calibration for Concentrating Solar Power Plants using Machine Vision," ENj-BCB125-1-0810.doc [online], BCB Informatica y Control, Pl. Emilio Jimenez Millas 2, 28008 Madrid (Spain) [retrieved on Feb. 15, 2010]. Retrieved from the Internet <URL: www.bcb.es/documentos/descargar.php?id=29>.

Cohen et al., "Final Report on the Operation and Maintenance Improvement Project for Concentrating Solar Power Plants," SAND99-1290 [online], Jun. 1999 [retrieved on May 16, 2012]. Retrieved from the Internet: <URL: http://infohouse.p2ric.org/ref/17/16933/1693301.pdf>.

Lopez-Martinez et al., "Vision-based system for the safe operation of a solar power tower plant," *Iberamia*, 2002, LNAI 2527: pp. 943-952.

Meduri et al., "Performance Characterization and Operation of Esolar's Sierra Suntower Power Tower Plant," SolarPACES 2010 Conference, Sep. 21-24, 2010, Perpignan, France.

Mills et al., "Multi-Tower Solar Array Project," *Proceedings of the Solar Harvest Conference, 40th Annual ANZSES Conference*, 2002.

Peterka et al., "Wind Load Reduction for Heliostats," Solar Energy Research Institute, U.S. Department of Energy [online], May 1986 [retrieved on May 16, 2012]. Retrieved from the Internet: <URL: http://www.nrel.gov/docs/legosti/old/2859.pdf>.

Phipps, Gary S., "Heliostat Beam Characterization System Calibration Technique," U.S. Department of Commerce, National Technical Information Service, Sandia Labs, SAND791532C, 1979.

Pottler et al., "Photogrammetry: A Powerful Tool for Geometric Analysis of Solar Concentrators and Their Components," Journal of Solar Energy Engineering, Feb. 2005, 127(1): pp. 94-101.

Rabl, A., "Tower Reflector for Solar Power Plan," Solar Energy, 1976, 18: pp. 269-271.

(56) References Cited

OTHER PUBLICATIONS

Roschke, E.J., "Wind Loading on Solar Concentrators: Some General Considerations," Jet Propulsion Laboratory, National Aeronautics and Space Administration, U.S. Department of Energy [online], May 1984 [retrieved May 16, 2012]. Retrieved from the Internet: <URL: http://ntrs.nasa.gov/archive/nasa/casi.ntrs.nasa.gov/19840024844_1984024844.pdf>.

Shortis et al., "Photogrammetric Analysis of Solar Concentrators," Proceedings of the 12th Australian Remote Sensing and Photogrammetry Conference, Fremantle, Australia, 2004, pp. 1-10.

Slack et al., "Esolar Power Tower Performance Modeling and Experimental Validation," SolarPACES 2010 Conference, Sep. 21-24, 2010, Perpignan, France.

Stine et al., "Power from the Sun", Chapter 10, "Central Receiver Systems" [online], 2001 [retrieved on Nov. 17, 2009]. Retrieved from the Internet: <URL: http://www.powerfromthesun.net/Book/chapter10/chapter10.html>.

Stone et al., "Analysis of Solar Two Heliostat Tracking Error Sources," ASME International Solar Energy Conference, Jan. 1999, SAND99-0239C [online], [retrieed on Feb. 16, 2010]. Retrieved from the Internet: <URL: http://www.osti.gov/servlets/purl/3312>.

Strachan et al., "Testing and Evaluation of Large-Area Heliostats for Solar Thermal Applications," Solar Thermal Test Department, Sandia National Laboratories, SAND92-1381, Feb. 1993.

Vant-Hull et al.., "Static and Dynamic Response of a Heliostat Field to Flux Density Limitations on a Central Receiver," Solar Engineering, 1990, pp. 31-38.

SYSTEMS AND METHODS FOR CONTROL AND CALIBRATION OF A SOLAR POWER TOWER SYSTEM

CROSS-REFERENCE TO RELATED APPLICATIONS

The present application claims the benefit of U.S. Provisional Application No. 61/565,883, filed Dec. 1, 2011, which is incorporated by reference herein in its entirety.

FIELD

The present disclosure relates generally to the conversion of solar radiation to usable forms of energy, such as heat and/or electricity, and, more particularly, to systems and methods for the control and calibration of a solar energy collection system by determining an accurate shape of the heliostat.

SUMMARY

Systems and methods for providing a predetermined thermal profile, such as a uniform solar heat flux profile to a solar receiver(s) or receiver sections in a solar energy-based generation system are disclosed herein.

A solar power generation system can have a thermal-electric power generation component, in which incident solar radiation is concentrated on a solar thermal receiver to heat a heat transfer or working fluid for use in electricity generation. A field of heliostat-mounted mirrors can reflect and concentrate incident solar radiation onto the solar receiver. In order to provide good control of the solar power generation system, it may be important to know the amount of solar flux which is incident on each point of the receiver. Knowing this information would allow one to calculate the amount of heat which is being transferred to the working fluid at any one point on the receiver.

The present disclosure is also directed to methods, systems, and devices for directly monitoring energy flux of a solar receiver in a solar energy-based power generation system. When operating a solar power system that includes a solar receiver, it is desirable to know, for example, by means of measurement or calculation, the quantity of energy transferred to a heat transfer fluid flowing through the receiver, usually expressed as energy per unit of area, which is essentially the captured energy per unit area, or flux. The flux may vary over the receiver surface. A total flux for the receiver as a whole may be defined, which may be the sum of all the energy captured and transferred to the heat transfer fluid.

Cameras may be used to determine the shape of the heliostat, which may then be used to characterize the reflected beam and/or a property of the cross-section thereof to determine a projected beam property. In some examples, a measurement of the shape or cross-sectional-area may be derived from the data obtained by the camera. In another example, a flux intensity map measuring the flux intensity at different locations of the reflected beam cross section may be derived from this data. Further, the shape of the heliostat may also be used to determine the centroid location, whereby the heliostat may be calibrated accordingly.

By knowing the exact shape of the heliostat, one would be able to obtain precise control of the incident flux on the receiver which would directly result into an overall more effective system.

Some embodiments relate to a solar energy collection system which may comprise a plurality of heliostats configured to reflect sunlight to a target mounted on a tower. Each heliostat may comprise a heliostat controller configured to control a respective heliostat of a plurality of heliostats such that the sunlight reflected therefrom is directed to at least one of a plurality of cameras. The plurality of cameras oriented to image the respective heliostat of the plurality of heliostats. The system further comprises a second controller which is configured to compute geometry data that defines a geometry of the surface of the respective heliostat from captured images thereof, the geometry data designating a plurality of subsections of the surface. The computing includes storing data indicating sections of the captured images corresponding to the plurality of subsections of the respective heliostat. The second controller is further configured to calculate data indicating respective surface normals of each of said subsections of each of said respective heliostat.

The plurality of cameras may be mounted on a tower. In some examples, both the plurality of cameras and the target are mounted on the same tower. The plurality of cameras may comprise at least one of a heat shield and an optical filter. The plurality of cameras is configured to capture images of the plurality of heliostats. For example, the plurality of cameras may capture at least two images of the respective heliostat such that for each additional image of the respective heliostat, the heliostat controller controls the respective heliostat to shift to a different position. In some embodiments, the heliostat controller may be configured to shift the heliostat an angular distance of approximately 1.25 milliradian in the elevation axis and/or approximately 1.25 milliradian in the azimuth axis.

In some embodiments, each pixel of the captured image may define a different subsection of the plurality of subsections. In other embodiments, each of the sections of the captured image are individual pixels of the captured image.

According to embodiments, the second controller may be configured to estimate at least one geometric parameter which is common for each subsection of the respective heliostat based at least in part on the calculated surface normal of each subsection. The second controller may also be configured to estimate at least one geometric parameter which is common for each subsection of the respective heliostat based at least in part on the calculated surface normal of each subsection and at least one nominal geometric parameter of the respective heliostat.

Some embodiments relate to a method of operating a solar energy collection system. The method may comprise at first times controlling a plurality of heliostats to reflect sunlight to a receiver mounted on a tower. At second times, which are different from the first times the method may comprise controlling at least one heliostat of the plurality of heliostats to reflect sunlight to a camera; acquiring multiple images of at least one heliostat of the plurality of heliostats; subdividing each image of the multiple images into a plurality of subsections, and calculating corresponding data indicating an assignment of each subsection of the plurality of subsections to a specific area of the least one heliostat of the plurality of heliostats; and calculating geometry data indicating a surface normal for each specific area of the least one heliostat of the plurality of heliostats responsively to the multiple images.

The step of acquiring multiple images may comprise shifting the heliostat an angular distance of approximately 1.25 milliradian in the elevation axis and/or approximately 1.25 milliradian in the azimuth axis and acquiring an image after each directional shift.

The method may further comprise, estimating at least one geometric parameter which is common for each specific area of the least one heliostat of the plurality of heliostats responsively to the surface normal of each specific area. Responsive to the estimated geometric parameter the heliostat may be oriented to reflect sunlight to the receiver responsively to the at least one geometric parameter. The estimating may be also based on a nominal geometric parameter of the least one heliostat of the plurality of heliostats. In some embodiments, the shape of heliostat is calculated based on the calculated geometry data.

Some embodiments relate to a method for controlling a solar energy collection system. The method may comprise capturing an image of a first heliostat of a plurality of heliostats; subdividing the image into a plurality of subsections, and calculating corresponding data indicating an assignment of each subsection of the plurality of subsections to a specific area of the first heliostat; calculating the surface normal of each specific area of the first heliostat; and calculating the solar flux distribution on an external face of a tower-based receiver based at least in part on the calculating the surface normal of each specific area of the first heliostat.

The method may further comprise, directing the heliostat to reflect incoming solar radiation onto aiming points on the external surface of the receiver based at least in part on the calculating of the solar flux distribution. The step of calculating the solar flux further may comprise estimating the shape of the beam reflected from the heliostat onto the external surface of the receiver.

Further embodiments relate to a method of operating a solar energy collection system. The method may comprise at first times controlling a plurality of heliostats to concentrate sunlight onto a receiver, the receiver being mounted on a tower. At second times, different from said first times, the method may comprise controlling a camera and a first heliostat of the plurality of heliostats to form multiple images of the sun reflected in the heliostat using a camera; processing each of the multiple images and calculating reflection data for each of a plurality of subsections of said each of the multiple images; calculating assignment data mapping regions of the first heliostat to respective ones of the subsections; and calculating data indicating a surface normal for each region responsively to the reflection data.

Objects and advantages of the present disclosure will be apparent from the following detailed description when considered in conjunction with the accompanying drawings.

BRIEF DESCRIPTION OF THE DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

DETAILED DESCRIPTION

According to the some embodiments, a solar power tower system includes at least one tower and at least one set of heliostats. Each heliostat tracks the sun in order to reflect light to a target on a tower. The heliostats can be arrayed in any suitable manner, but preferably their spacing and positioning are selected to provide optimal financial return over a life cycle according to predictive weather data and at least one optimization goal such as total solar energy utilization, energy storage, electricity production, or revenue generation from sales of electricity.

An energy conversion target or solar receiver uses reflected and optionally concentrated solar radiation and converts it to some useful form of energy, such as heat or electricity. The solar receiver may be located at the top of a receiver tower or at some other location, for example if an intermediate reflector (also called a secondary reflector) is used to bounce light received at the top of a tower down to a receiver located at ground level or at an intermediate height. For the present disclosure, the terms 'energy conversion target' and 'solar receiver' are used interchangeably and refer to a device or apparatus for converting insolation into some other form of energy—for example, electricity or thermal energy.

Figure 1:
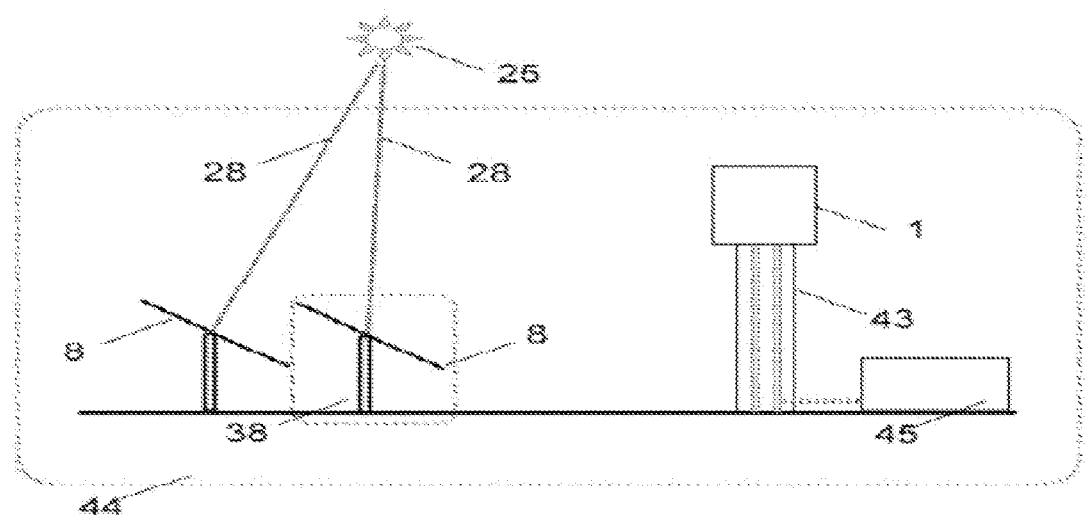
FIGS. 1-2 and are diagrammatic elevation views of a plurality of heliostats and a central power tower, according to one or more embodiments of the disclosed subject matter.

Referring now to the figures and in particular to FIG. 1, a solar power tower system 43 is provided in which heliostats 38 include mirrors 8 that reflect incident solar radiation 28 onto a target mounted on tower 43 (for example, solar receiver 1). The heliostat-mounted mirrors 8 are capable of tracking the apparent movement of the sun 25 across the sky each day in order to maintain the reflective focus in the direction of the receiver 1 as the angle of the incident radiation 28 changes. This tracking capability may be provided at least in part by a heliostat controller (not shown in FIG. 1, but see, for example, element 65 of FIG. 3) for controlling one or more orientation parameters of mirror 8 to aim reflection beam 398.

The skilled artisan will realize that the heliostat controller may include any combination of mechanical parts (for example including motors, actuators, etc. . . . ) and/or electrical circuitry (for example, integrated circuits). In one non-limiting example, the electrical circuitry includes one or more computer microprocessors configured to execute software or code module(s) residing in volatile memory. In another non-limiting example, the heliostat controller may include gate array electronics for example, field-programmable gate array (FPGA). As will be explained below, in some embodiments, heliostat controller of heliostat 38 may also be configured for aiming the mirrors 8 at locations other than the target located atop tower 43.

Figure 2:
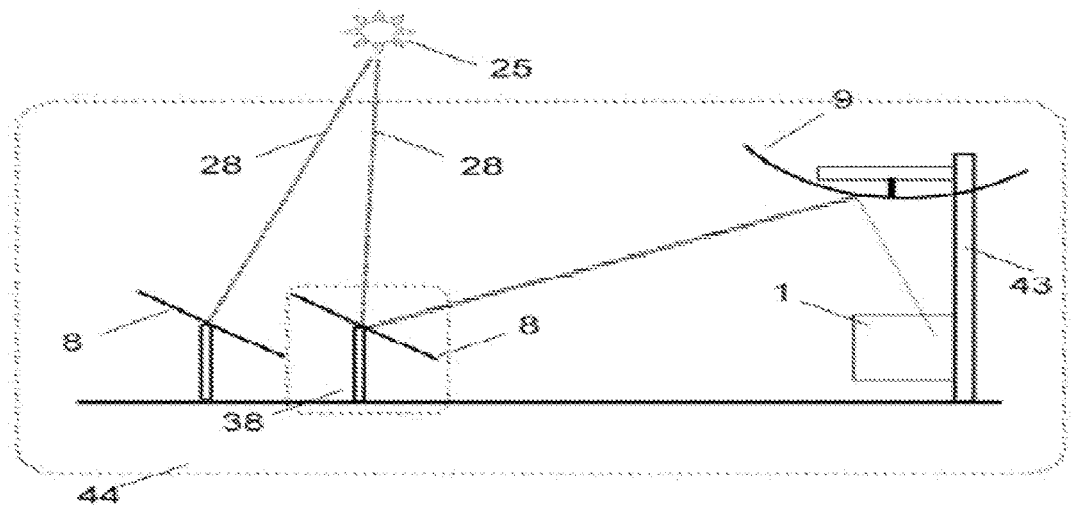

In the example of FIG. 1, solar receiver 1 (for the present disclosure, "receiver" and "solar receiver" are used interchangeably) is located atop a tower 43. FIG. 2 illustrates an alternative embodiment where receiver 1 is located on the ground, and the target is a secondary reflector (in contrast to FIG. 1 where the target is a solar receiver). Thus, in the example of FIG. 2, the heliostat-mounted mirrors 8 reflect solar radiation onto one or more secondary reflectors 9 which further reflect the radiation onto the receiver 1.

As shown in the figures, the reflection of the incident radiation beam 28 produces a reflection beam 398 which is reflected to the target, which is either a solar receiver (i.e., for converting insolation to another form of energy such as thermal energy or electricity) or a secondary reflector configured to relay light to a solar receiver. In one example, the solar receiver (either mounted on the tower as in FIG. 1 or operative to receive insolation from a secondary mounted on the tower as in FIG. 2) is a solar boiler for boiling water and/or heating steam—this solar boiler may be operatively linked to an apparatus 45 for converting solar steam to electricity. In another example, the solar receiver is a molten salt solar receiver.

It is appreciated that the figures are not required to be to scale. For example, in some embodiment, the tower is much taller (e.g. at least 5 times or 10 times or 20 times or more) than heliostats 38. In different examples, the tower height is at least 25 meters, at least 75 meters, at least 100 meters, at least 125 meters, at least 200 meters, or even higher.

Although the heliostat mirror is drawn in the figures as a straight line representing a planar mirror, it is appreciated that this is not a limitation, and that other shaped mirrors may be employed. For example, the heliostat mirror may be concave.

As noted above, each heliostat may include a heliostat controller including mechanical parts and electrical circuitry for tracking the sun. In some embodiments and as will be discussed below, heliostat controllers may be operative to move the reflection beam to another location other than the target (e.g., the receiver 1 or the reflector 9).

In some embodiments, each heliostat controller is autonomous and may aim mirror 8 to provide a certain functionality without requiring external input. Alternatively or additionally, each heliostat controller may respond to one or more electronic communications (for example, external commands) received from external electronic device or system (located at any location) describing how to aim mirror 8. For both cases, it may be said that the heliostat controller is 'operative' to provide the functionality (for example, aiming functionality).

A solar power tower system 43 also generally includes a heliostat field control system for helping the system operator or owner attain or maintain pre-defined operating parameters and/or constraints, some of which may be based on achieving optimization goals and some of which may be based on maintaining the safety of the system and its operation. For example, a heliostat field control system can be used to ensure that light energy flux is distributed across the surface of a target in accordance with a predetermined set of desired values (see, for example, International Publication No. WO 2009/103077, which is incorporated by reference herein in its entirety). Alternatively, it can be used to maximize conversion of energy from solar radiation to latent and/or sensible heat in a working fluid within a receiver, and/or conversion of solar energy to electricity by photovoltaic (or photoelectrochemical) means, while ensuring that local temperatures on the surface of the receiver, or local concentrations of solar flux, do not exceed a predetermined local maximum.

Overall control of the multiple heliostats can be either centralized in a single computer or distributed among several or many processors. Thus, in some embodiments, decisions about where to aim the heliostats may be carried out locally by the various heliostat controllers. Alternatively or additionally, the heliostat field controller may communicate aiming instructions to one or more heliostat controllers which are configured to then provide this aiming functionality.

Figure 3:
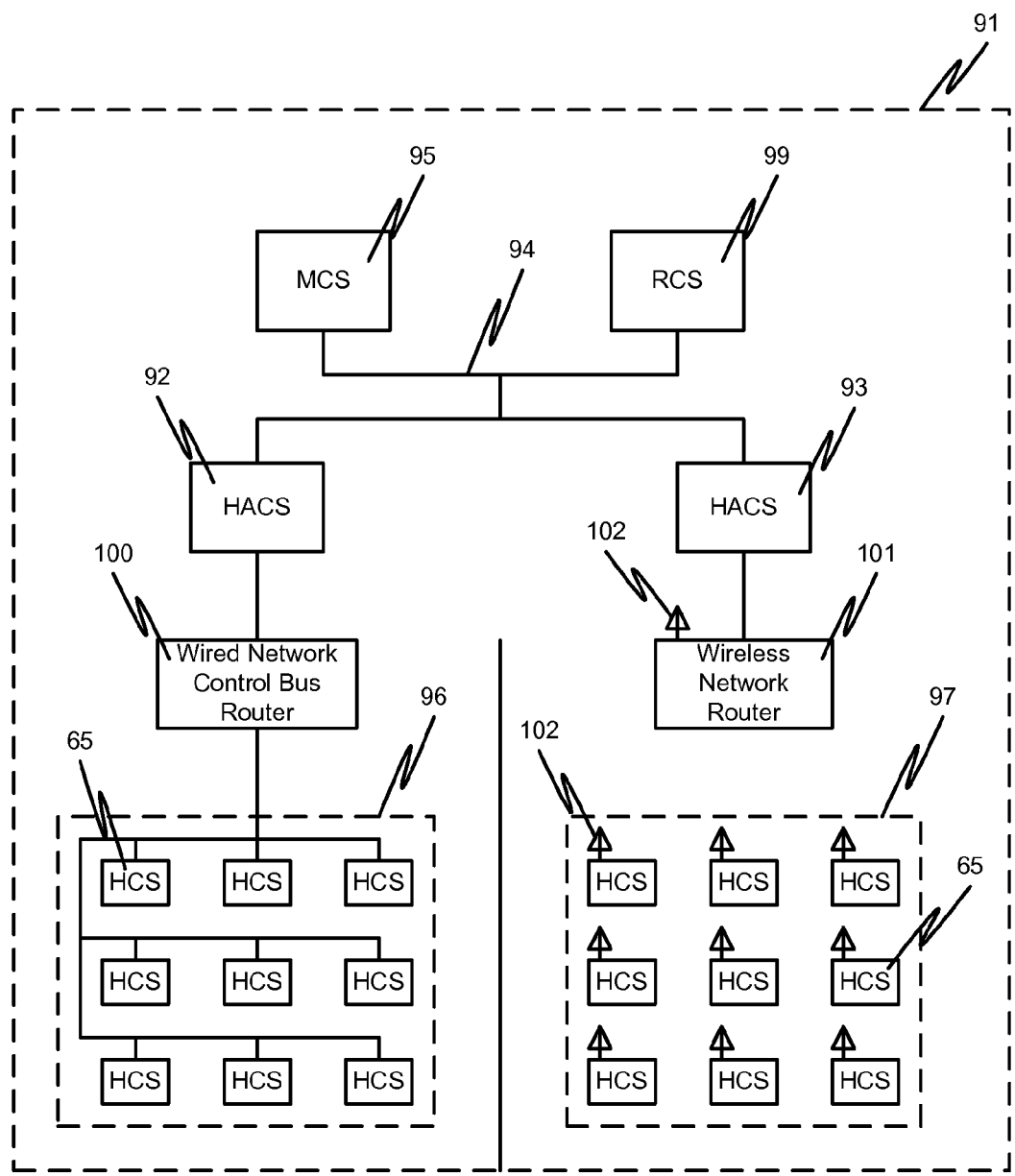
FIG. 3 is an illustration of a hierarchical central heliostat control system, according to one or more embodiments of the disclosed subject matter.

Heliostats 70 in a field 60 can be controlled through a central heliostat field control system 91, for example, as shown in FIG. 3. For example, a central heliostat field control system 91 can communicate hierarchically through a data communications network with controllers of individual heliostats. Additionally or alternatively, the heliostat field can be controlled by any combination or variation on centralized control and distributed control, for example, by using a control system that communicates hierarchically through a data communications network with individual or final controllers for each heliostat.

FIG. 3 illustrates a hierarchical control system 91 that includes three levels of control hierarchy, although in other implementations there can be more or fewer levels of hierarchy, and in still other implementations the entire data communications network can be without hierarchy, for example, in a distributed processing arrangement using a peer-to-peer communications protocol. At a lowest level of control hierarchy (i.e., the level provided by heliostat controller) in the illustration there are provided programmable heliostat control systems (HCS) 65, which control the two-axis (azimuth and elevation) movements of heliostats (not shown), for example, as they track the movement of the sun. At a higher level of control hierarchy, heliostat array control systems (HACS) 92, 93 are provided, each of which controls the operation of heliostats 70 (not shown) in heliostat fields 96, 97, by communicating with programmable heliostat control systems 65 associated with those heliostats 70 through a multipoint data network 94 employing a network operating system such as CAN, Devicenet, Ethernet, or the like. At a still higher level of control hierarchy a master control system (MCS) 95 is provided which indirectly controls the operation of heliostats in heliostat fields 96, 97 by communicating with heliostat array control systems 92, 93 through network 94. Master control system 95 further controls the operation of a solar receiver (not shown) by communication through network 94 to a receiver control system (RCS) 99.

In FIG. 3, the programmable heliostat control systems 65 provided in heliostat field 97 communicate with heliostat array control system 93 through network 94 by means of wireless communications. To this end, each of the programmable heliostat control systems 65 in heliostat field 97 is equipped with a wireless communications transceiver adapter 102, as is wireless network router 101, which is optionally deployed in network 94 to handle network traffic to and among the programmable heliostat control systems 65 in heliostat field 97 more efficiently. In some embodiments, the portion of network 94 provided in heliostat field 96 can be partially based on copper wire or fiber optic connections. Master control system 95, heliostat array control system 92 and wired network control bus router 100, which is optionally deployed in network 94 can be equipped with a wired communications adapter in order to handle communications traffic to and among the programmable heliostat control systems 65 in heliostat field 96 more efficiently. In some embodiments, master control system 95 is optionally equipped with a wireless communications adapter (not shown).

One of the possible functions of a control system (including local heliostat controller(s) and/or one or more higher-level controllers—for example, a centralized heliostat field controller) is to direct heliostats to various aiming points on the surface of a target, or alternatively away from the surface of a target when operating conditions require it. This is done on the basis of periodically or continuously evaluating various inputs, which can include, inter alia, predictive and/or measured meteorological data; and measured and/or calculated operating conditions and operating parameters of the heliostats and the receivers. Among the operating conditions and parameters which can be used in applying control functions are instant and historical temperature data for the external surface of the receiver, and instant and historical light energy flux density data for the external surface of the receiver. For example, the distribution of temperature across the surface of a receiver at a given moment can be compared with a pre-determined set of desired values or with the data for an earlier moment in time in order for the controller to decide whether current heliostat aiming instructions are adequate to meet system optimization goals or safety-based operational constraints, and especially when taking into account measured and predictive weather data. Similarly, the distribution of light energy flux density across the surface of a target at a given moment can be compared with a predetermined set of desired values, or, alternatively, used to calibrate the calculation of predicted flux densities that are used by a control system which generates sets of aiming points and directs heliostats to those aiming points based on those predicted patterns of resultant light energy flux density. The skilled artisan is directed to, for example, the incorporated by reference International Publication No. WO 2009/103077.

Another function of a control system includes the calibration of heliostats, or more specifically, the calibration of the reflection of solar radiation on a target with respect to a desired or predicted reflection, for example in terms of the location of the reflection, or in terms of the shape of the reflection, or in terms of the intensity of light flux at a plurality of points in the reflection, or in terms of any combination of data that describes the beam projection (reflection) in a desired format. As noted above, this functionality may be provided by the heliostat controller of a single heliostat either autonomously or in response to electronic communications received, for example, from a heliostat field controller.

It is noted that in many cases, heliostat controller attempts to aim the heliostat at the target so that the centroid of the reflection beam is located at a target centroid location. In many real-world scenarios, over time certain factors may cause the heliostat to deviate from its preferred operating parameters, for example, wind or mechanical backlash may move the mirror or one or more heliostat moving parts associated with the aiming the heliostat, changes in temperature may distort the mirror, seismic activity may influence heliostat aiming or any other factors may influence heliostat aiming.

For the present disclosure, the terms 'aiming' and 'directing' are used interchangeably.

In some embodiments, a system comprising a plurality of heliostats configured to reflect sunlight to a target mounted on a tower and a plurality of cameras directed towards the heliostats and is configured to capture images of at least one of the heliostats.

In some embodiments, at one or more times, instead of being directed at the target, the reflection beam (i.e., a reflection of a beam of sunlight) produced by each heliostat may be directed at a camera. The camera is used for detecting the light reflected by heliostats.

The images captured by the camera may be useful in determining an accurate shape of the heliostat. In one non-limiting example, the data obtained from the captured image may be used to calculate the surface normal of a plurality of subsections/specific areas of the heliostat.

As will be discussed in greater detail below, the data acquired by each of the cameras may be used to characterize the reflected beam and/or a property of the cross-section thereof to determine a projected beam property. In one non-limiting example, a measurement of the shape or cross-sectional-area (or an indicative parameter thereof) may be derived from the data. In another example, a flux intensity map measuring the flux intensity at different locations of the reflected beam cross section may be derived from the data. In yet another example, a so-called beam offset may be derived from the data.

The data may also be useful for calibrating the heliostat to determine and/or modify one or more operating parameters of one or more of heliostats. The heliostat calibration may be carried out in a closed-loop system although alternatively it can be used in an open-loop system. A closed-loop system is one in which the data obtained or derived by the controller, is used to change heliostat aiming instructions, to change the characterization of a heliostat in a database, or to bring about heliostat maintenance by having a computer program analyze the data and issue electronic instructions on a periodic or real-time basis without significant operator intervention. An open-loop system is one in which the data is stored or analyzed, and used at a later time for changing heliostat aiming instructions or for bringing about heliostat maintenance, usually after intervention by a human operator.

In some embodiments, the plurality of cameras are preferably positioned so as to be accessible to the reflected light beams of large numbers of heliostats and therefore are best located at, near or on a central tower on which a receiver or other target is located since large numbers of heliostats are generally capable of aiming reflected light in the direction of a central tower. The plurality of cameras are most preferably close to a target (such as a receiver or secondary reflector) so as to minimize travel time of heliostats diverted from regular tracking (focusing reflected light onto the target) for the purposes of calibration.

Figure 4:
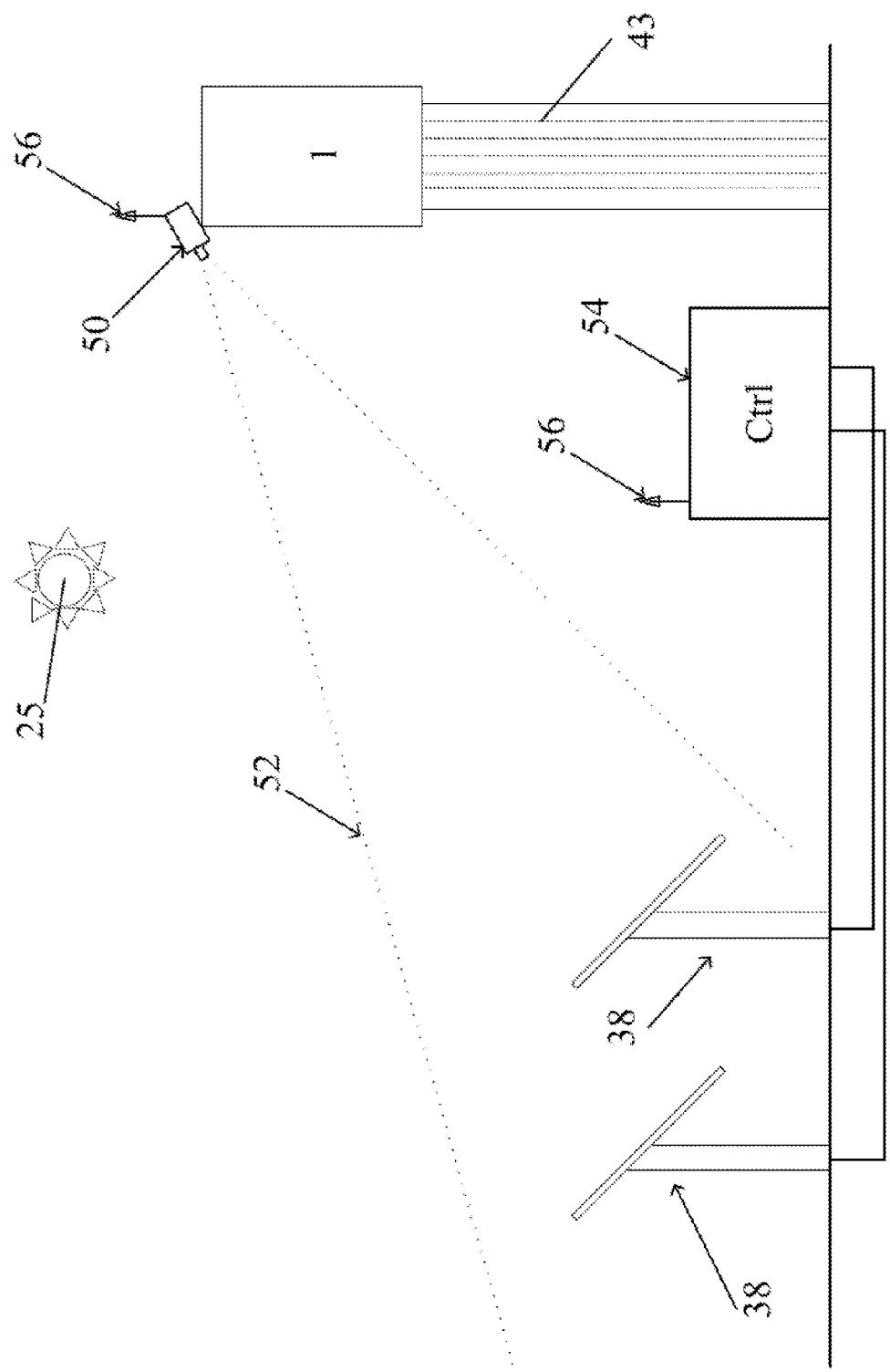
FIG. 4 is a diagrammatic elevation view of a central solar power system with a camera, according to one or more embodiments of the disclosed subject matter.

Referring now to FIG. 4, a camera 50 is shown in a solar energy collection system similar to that illustrated in FIG. 1. The camera may be positioned on tower 43. According to some embodiments, camera 50 may be positioned below receiver 1 (not shown), or alternatively above receiver 1. Camera 50 can have a field of view 52 which encompasses at least a least a portion of the solar field. In some embodiments, camera 50 may be configured to capture a plurality of images of at least one heliostat of a plurality of heliostats in a solar field. Camera 50 may transmit the resulting image to controller 54. Transmission of the image to controller 54 may be affected by a wireless transmission link 56, or alternatively by a wired transmission link (not shown).

According to an embodiment, the camera also includes a heat shield. The purpose of the heat shield is to eliminate most the heat incident on the camera. Without the heat shield, the heat may increase the temperature of the camera beyond its recommended operating conditions. As the number of heliostats reflecting sunlight to the camera increases, the temperature of the camera increases. In some embodiments, this may limit the number of heliostats that may reflect sunlight to the camera at the same time. Accordingly, the purpose of the heat shield is to reduce the camera temperature. In some embodiments, the heat shield is a highly reflective material. In other embodiments, an air or water cooling system may be included to remove heat from the camera. Alternatively, the camera may have a reduced cross-section, thereby reducing the amount of light incident on the camera body.

One method of accurately determining the reflected flux on the surface of the receiver is by knowing the shape of the heliostat. The intensity of each point of the reflected beam may be calculated by knowing the different characteristics of the heliostat reflecting said beam. For example, by knowing the shape of the reflective surface of the heliostat, one would be able to determine the surface normal of individual subsections/specific area of the heliostat, and hence calculate the beam shape, beam location and flux intensity of each heliostat individually.

Similarly, the calibration of the reflected beam projection on the receiver with respect to a desired or predicted reflection may also be achieved.

Controller 54 can be configured to use the captured image obtained from the camera in order to calculate the surface normal of a specific subsection/specific area of the heliostat. According to some embodiments, controller 54 is configured to create subdivisions of a heliostat. The heliostat may be subdivided as many times as necessary to provide sufficient data that can be subsequently used to determine a precise shape of the heliostat. As may be expected, the greater number of subdivisions, the more accurate one may determine the shape of the heliostat.

Figure 5:
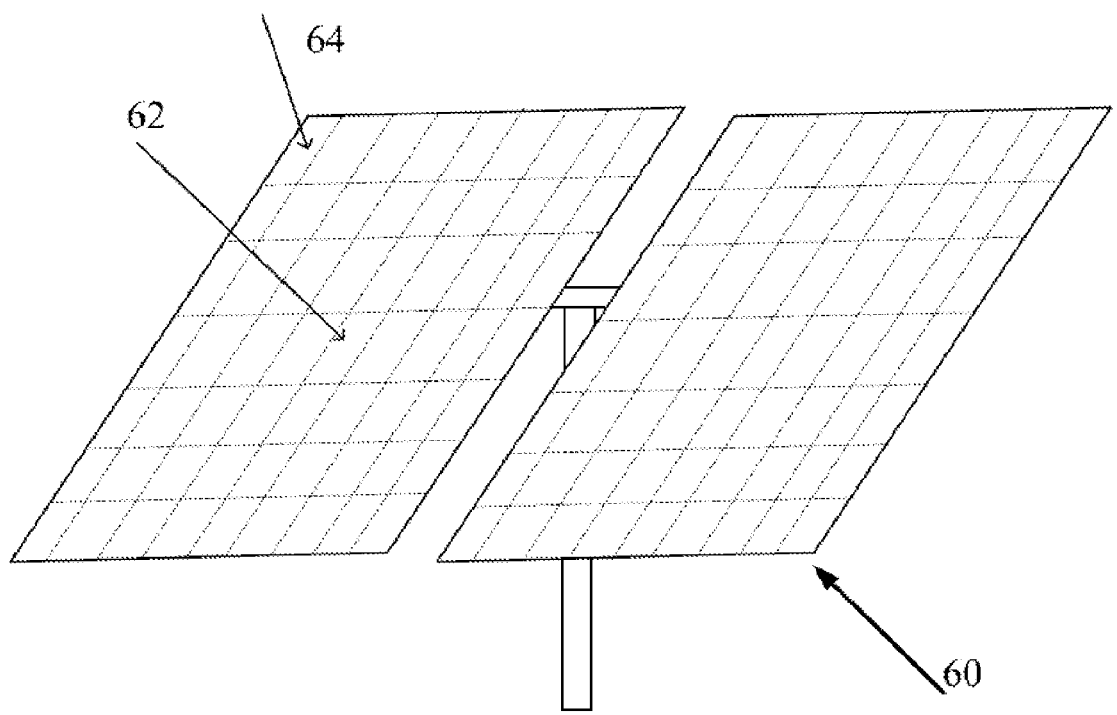
FIG. 5 is an illustration of a heliostat subdivided into individual elements, according to one or more embodiments of the disclosed subject matter.

Referring now to FIG. 5, a heliostat 60 may include a plurality of virtual subdivisions 62, which aggregately cover at least a portion of the surface of heliostat 60 and preferably substantially cover the entire surface of heliostat 60. In a non-limiting example of a solar energy collection system, each subdivision 64 may correspond to the section of the heliostat covered by a single pixel of resolution of a camera. Alternatively, each pixel may correspond to multiple subdivisions. In other words, controller 54 may also be configured to assign each individual subdivision 64 to a specific element/area of the heliostat. As shown in FIG. 5, subdivision 64 refers to an element located in the top-left-hand corner of heliostat 60.

As will be discussed below in detail, controller 54 may then calculate the surface normal for each subdivision 64 of heliostat 60. By knowing the surface normal of each subdivision of heliostat 60, an accurate shape of the heliostat may be determined. With this information, reflected beam characteristics may be calculated and/or determined. These characteristics, may include, inter alia, beam, shape, flux density map and beam location (i.e. calibration).

According to embodiments, a heliostat may be directed towards a camera in such a manner that at least a portion of the heliostat reflects sunlight towards the camera.

Figure 6A:
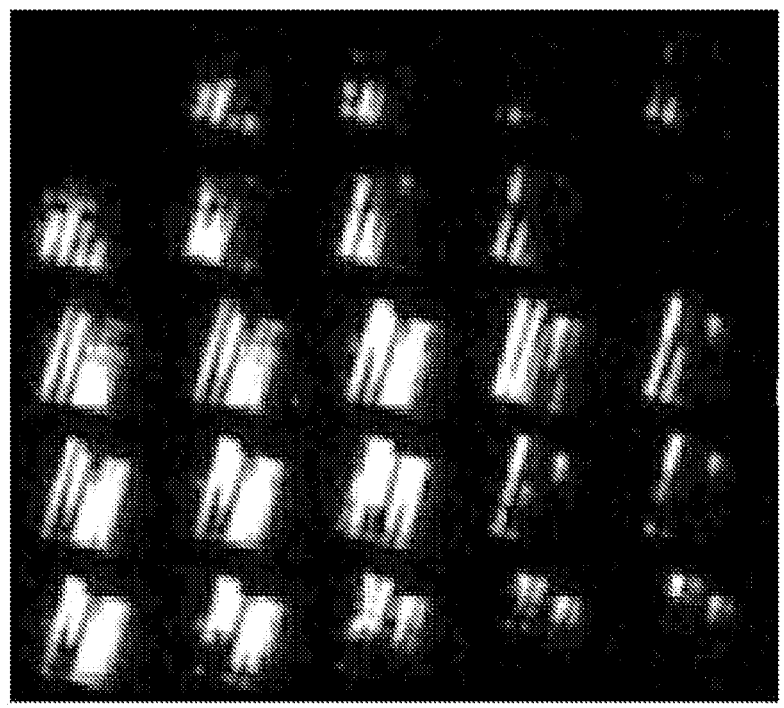
FIG. 6A shows a plurality of snapshots of a heliostat oriented at different orientation angles, according to one or more embodiments of the disclosed subject matter.

FIG. 6A illustrates a plurality of snapshots of a single heliostat oriented at different orientation angles. In the example of FIG. 7A, it is shown that depending on the orientation of the heliostat, different portions of the heliostat reflect light towards the camera. In some examples, controller 54 may determine if light is reflected to the camera from a specific element of the heliostat based on a yes/no response function. In other examples, the controller may calculate the amount of light being reflected to the camera from a specific element of the heliostat based on the light intensity of the specific element as produced in the captured image.

Figure 6B:
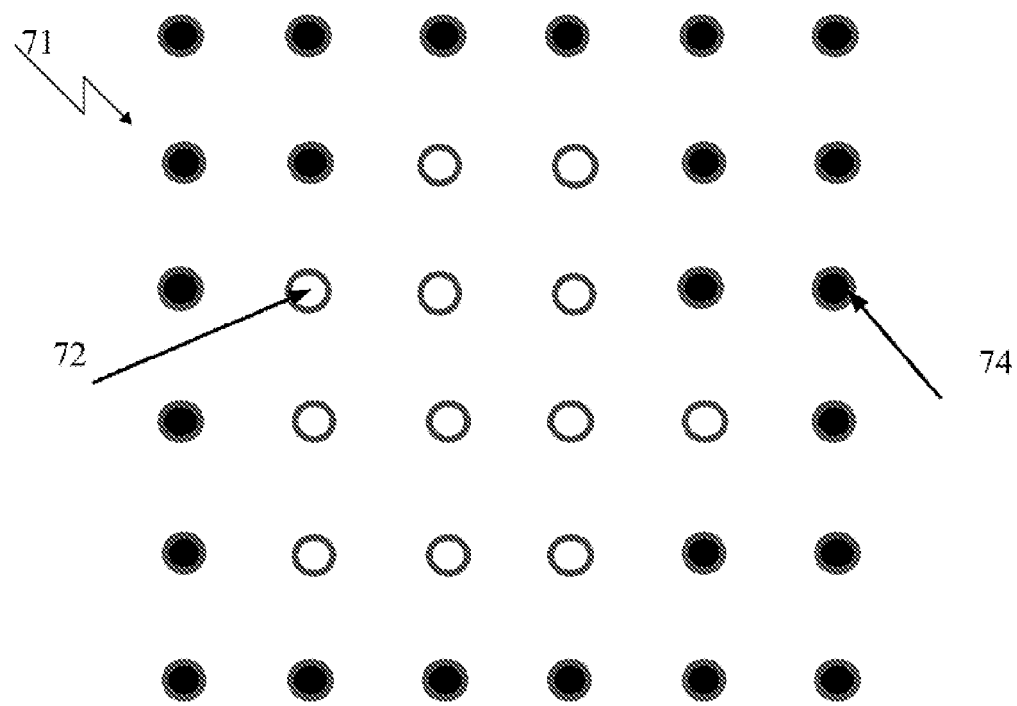
FIGS. 6B and 6C are illustrations of a heliostat in which the elements of the heliostat which reflect light to the camera are identified, according to one or more embodiments of the disclosed subject matter.
Figure 6C:
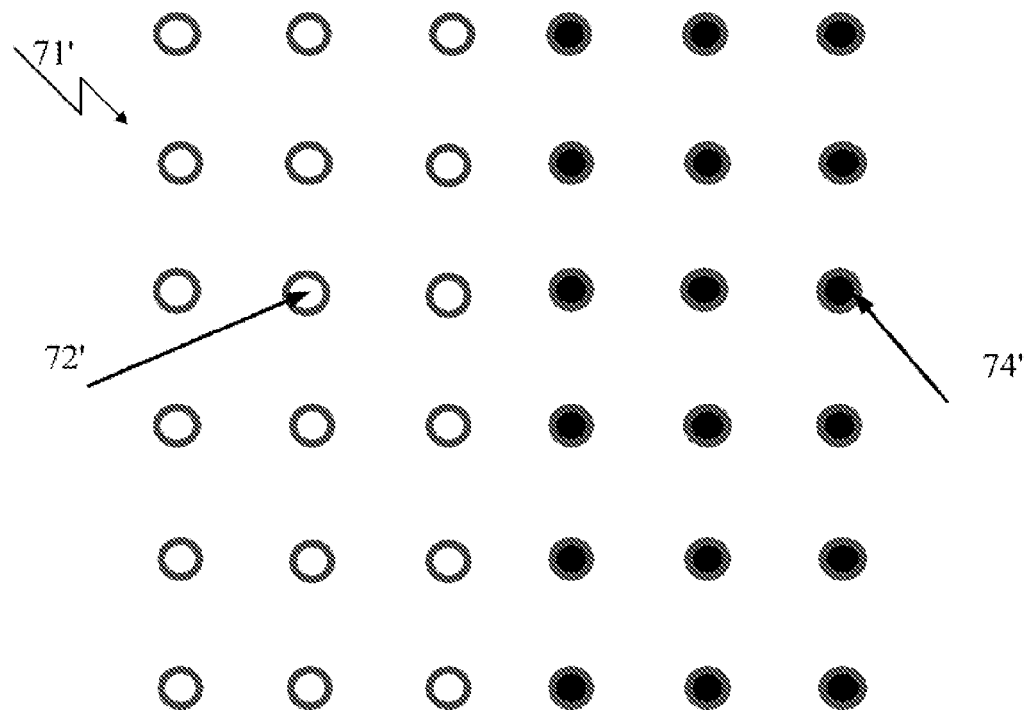

The example of FIGS. 6B and 6C are simple illustrations of a heliostat in which the elements of the heliostat which reflect light to the camera are identified. Heliostat 70 of FIG. 6B is at a first orientation angle with respect to the azimuth and elevation 71 and heliostat 70 of FIG. 6C is at a second orientation angle 71' with respect to the azimuth and elevation. Heliostat 70 at a first orientation 71 reflects light to the camera from specific points/subdivisions shown as white circles 72. The specific points/subdivisions shown as black circles 74 indicate points/subdivisions which do not reflect light to the camera at the first orientation. Heliostat 70 at a second orientation 71' reflects light to the camera from specific points/subdivisions shown as white circles 72'. The specific points/subdivisions shown as black circles 74' indicate points/subdivisions which do not reflect light to the camera at the second orientation.

According to some embodiments, a heliostat is controlled such that a least a portion of the heliostat reflects light to the camera. The camera which is configured to capture images of the heliostat captures an image of the heliostat. In order to determine the surface normal of each subdivision of the heliostat, the heliostat may be rotated about an axis (i.e. yaw and/or pitch). In some examples, the heliostat is rotated an angular distance of 1.25 milliradian in the azimuth axis (yaw) and/or approximately 1.25 milliradian in the elevation axis (pitch).

The above process may be repeated until a sufficient number of images of the heliostat with different orientation angles are obtained. The larger number of images of the heliostat at different orientation angles obtained, the more accurate shape of the heliostat may be determined. According to some embodiments, the heliostat may be rotated to at least 4, at least 10, at least 20 or at least 50 different orientation angles. In other embodiments, the images may be captured at different times of the day when the sun is in different positions, thereby producing additional data of vectors and angles in order to determine the surface normal of each element of the heliostat. The data captured by images taken at different times of the day, may be used in calibrating the heliostat and updating its geometric parameters.

Figure 7:
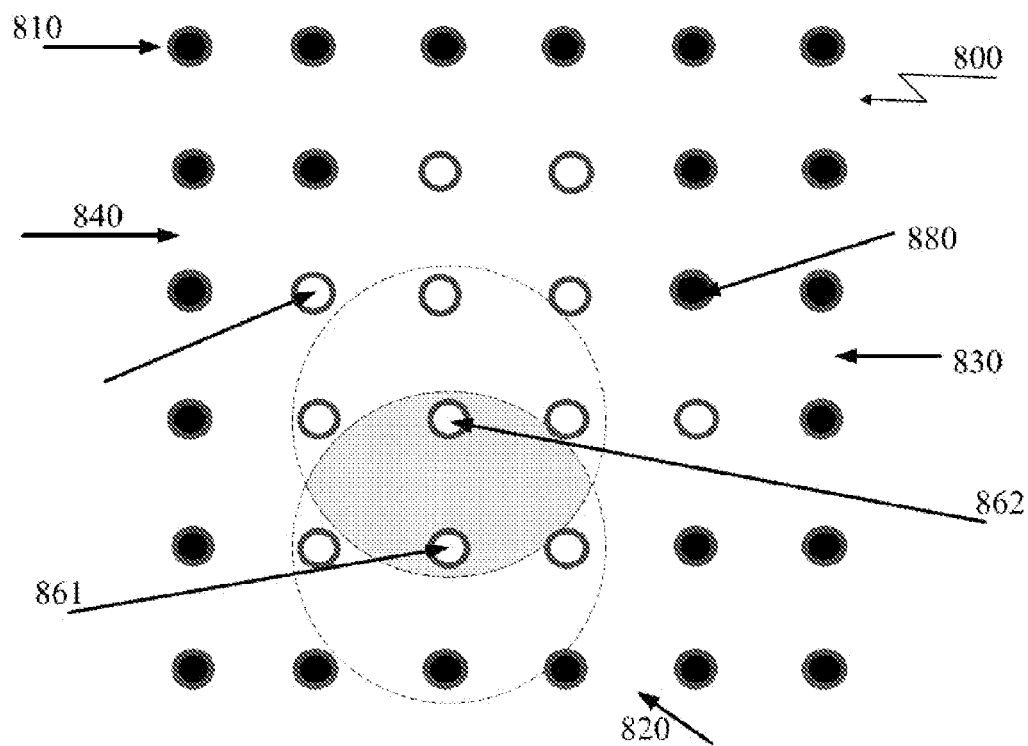
FIG. 7 is an orientation map illustrating the orientation of the heliostat for a particular subdivision/element of the heliostat, according to one or more embodiments of the disclosed subject matter.

In order to determine the surface normal of each subdivision of the heliostat, a map as shown in FIG. 7 may be created for each subdivision of the heliostat. A map 800 of a specific subdivision is essentially an orientation map and illustrates the orientation of the heliostat for a particular subdivision/element of the heliostat. Map 800 indicates whether the particular subdivision/element reflects light to the camera. According to some embodiments, upper row of the map 810 relates to the highest elevation of the elevation as recorded by the camera, lowest row of the map 820 relates to the lowest elevation of the elevation as recorded by the camera, left-most column of the map 830 and right-most column of the map 840 relate to the furthest distance travelled by the heliostat tangential to the earth's surface as recorded by the camera. For each orientation angle of the heliostat, the map illustrates whether the particular subdivision/element reflects light to the camera. In the specific example of FIG. 7, the white colored circles 860 indicate that light is reflected to the camera from the particular subdivision/element, and the black colored circles 880 indicate that light is not reflected to the camera from the particular subdivision/element. Other embodiments may take into account the light intensity detected by the camera. For example, a grayscale image of the heliostat may be acquired by the camera. The colors black and white are used in this example for illustrative purposes only. By assigning a different grayscale value to each subsection, the amount of sunlight being reflected from the specific subdivision/element may be more precisely determined. Due to the fact that the subsection may not be purely planar, and the brightness of the sun does not have one value, the use of a grayscale image may provide more accurate data.

In order to reflect to determine the surface normal of each subdivision of the heliostat, the above discussed system uses known geometric information about the solar energy collection system. The direction of the sun may be obtained by known methods when the time and location on the earth are known. The location of the cameras and heliostat are known from standard surveying techniques, for example, by using global positioning system (GPS) equipment. However, it is not known which part of the sun is being reflected by the heliostat to the camera.

The data and configuration of white colored circles 860 as shown in FIG. 7 may be used to accurately determine the orientation angle of the heliostat which reflects light from the center of the sun to the camera. By discounting black dots 880, and by combining the known possible from each white dot 860, it is possible to accurately determine the orientation angle of the heliostat. For example, by drawing a circle around white spot 861 whose size is relative to the diameter of the sun, it is know that light from the center of the sun is found somewhere in that circle. By drawing an identical circle around circle 862 it is known that the light from the center of the sun may only be in the area intersecting both circles. The same process is repeated so as to include all white circles 860. This allows for the determination of the normal vector which is required to bisect the vector from the subdivision of the heliostat to the center of the sun and the vector from the subdivision of the heliostat to the camera. This requirement may be necessary in order to ensure that sunlight is reflected to the camera.

By knowing the surface normal of each subdivision of the heliostat, one may determine the precise shape of the heliostat. This information may be further used to calculate the shape of the reflected beam as well as the flux density map of the reflected beam. Further, the geometric parameters may be calibrated and updated by knowing the surface normal of each subdivision of the heliostat. Geometric parameters are those parameters which define the precise location and/or orientation of the heliostat in terms of a global coordinate system. Non-limiting examples of the parameters may include manufacturing uncertainties and/or installation uncertainties, such as, pylon verticality, pylon orientation, offset in the elevation, angle between the azimuth orientation axis and the elevation orientation axis, angle between the elevation orientation axis and the mirror, etc.

Figure 8A:
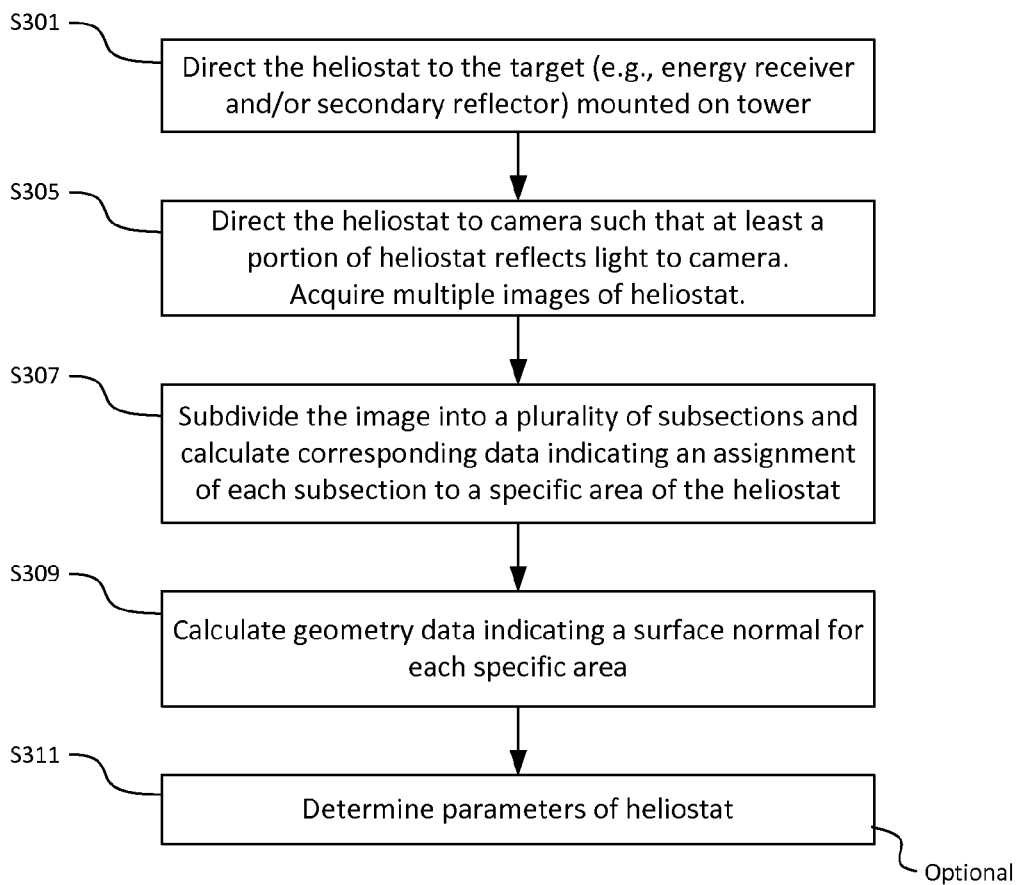
FIGS. 8A-8B are flowcharts of routines of operating a solar energy system, according to one or more embodiments of the disclosed subject matter.
Figure 8B:
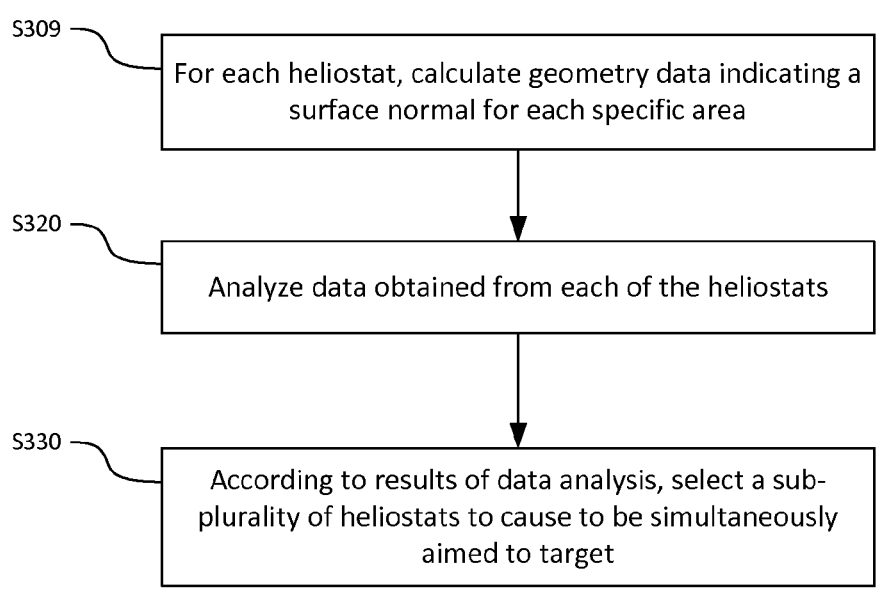

FIGS. 8A-8B are flow charts of routines for operating a heliostat of a solar energy system according to some embodiments.

Reference is made to FIG. 8A. In step S301 a heliostat is directed at the target (e.g. a solar energy conversation target and/or a secondary reflector) mounted on the tower for example, to generate energy from the reflected beam that is projected onto the target. In step S305, the same heliostat is directed to the camera such that at least a portion of the heliostat reflects light to the camera and multiple images of the heliostat are acquired.

In a first example, the heliostat is redirected from a first orientation when it is aiming at the target to a second orientation when it is aimed at the camera. In a second example, the heliostat is directed at the target, and then may be re-directed to aim away from both the tower and the camera. In step S307 the image is subdivided into a plurality of subsections. Corresponding data indicating an assignment of each subsection to a specific area of the heliostat may be calculated. These subsections are to be assigned to a specific area of the heliostat. In some examples, the acquired image of the heliostat may be superimposed with a virtual grid such that each subsection corresponds to a specific section of the heliostat (see FIG. 5). In step S309 geometry data indicating a surface normal for each specific area are calculated. Some embodiments may include step S311 in which one or more parameters of the heliostat are determined.

Reference is now made to FIG. 8B. In step S309, for each specific area of the heliostat, respective geometric data indicating a surface normal are calculated. In step S320, the data is analyzed. In one particular example, the respective shape of each heliostat or flux intensity map of each heliostat is determined, for example, to create a database of heliostat shapes or heliostat intensity maps. In step S330, according to the results of the data analysis, heliostat selection may be carried out i.e., a sub-plurality of the plurality of heliostats may be selected for simultaneous aiming at the target. In one example, it may be desired to provide a certain flux distribution at the target, and heliostat reflection beams (whose beam parameters are known from the data) may be selected accordingly.

In some embodiments, the system includes software for providing instructions to heliostats to track to the camera, including at least one set of tracking coordinates and tracking speed. The instructions can be propagated through a data network or communicated directly in accordance with the architecture of the solar field control system. The instructions, if transmitted in advance, may include a time when the heliostat controller should initiate execution of the instructions, and the heliostat controller may be equipped with data storage means for storing such instructions. Alternatively the instructions can be pre-programmed in a heliostat controller (e.g., stored on a computer readable medium of the controller). For example, a heliostat controller may include a stored set of instructions to track to the camera with a given periodicity such as, for example, weekly or monthly.

In preferred embodiments, the system also includes computer hardware and software for analyzing the data obtained or recorded from the digital imaging devices or other light cameras. The analysis is performed for the purpose of calibrating the heliostat, where calibrating may include at least one of: determining or approximating the beam projection shape and its deviation from the predicted; determining the intensity of light at a plurality of points within the beam projection and any deviation from the projected distribution of light intensity; correcting a structural or assembly error, or shape aberration, or any other malfunction or deviation from design in a heliostat; storing or using any of these data elements for the purpose of updating or changing a database of heliostat-related data or of updating or changing the aiming and/or tracking instructions of a heliostat; or analysis of the data by a system designer or operator.

The analysis software is capable of calculating a beam projection shape and/or calculating the statistical distribution, using data obtained and/or recorded by the cameras, and optionally using statistical techniques applying a Gaussian or other probabilistic distribution to the light intensity of a heliostat beam projection. Additionally, the software can be capable of producing a digital map of the flux intensity at a plurality of points in the beam projection. Any of these calculated parameters can be used in the calibration of heliostats as described above. Heliostats (or a control system for heliostats and/or heliostat controllers) are configured to modify aiming instructions such as target coordinates in response to data obtained during the calibration process or in response to the result of the analysis of the data.

The analysis software can also include software for transformation of a curvilinear projection in order to 'translate' a beam projection shape and/or map of light intensity values to the surface geometry of a receiver, taking into account: the different angle of incidence of reflected light on the receiver compared with that on the camera; the different attitude of the receiver with respect to the heliostat field; and/or the external surface characteristics of the receiver (for example, which may comprise individual round boiler tubes rather than a smooth external surface panel).

In another embodiment, a solar power tower system includes a solar field and a plurality of cameras on a tower. A target such as a thermal or photovoltaic receiver, or alternatively a secondary reflector, is situated at or near the top of the tower. The plurality of cameras can be provided in accordance with any of the embodiments described above.

Figure 9A:
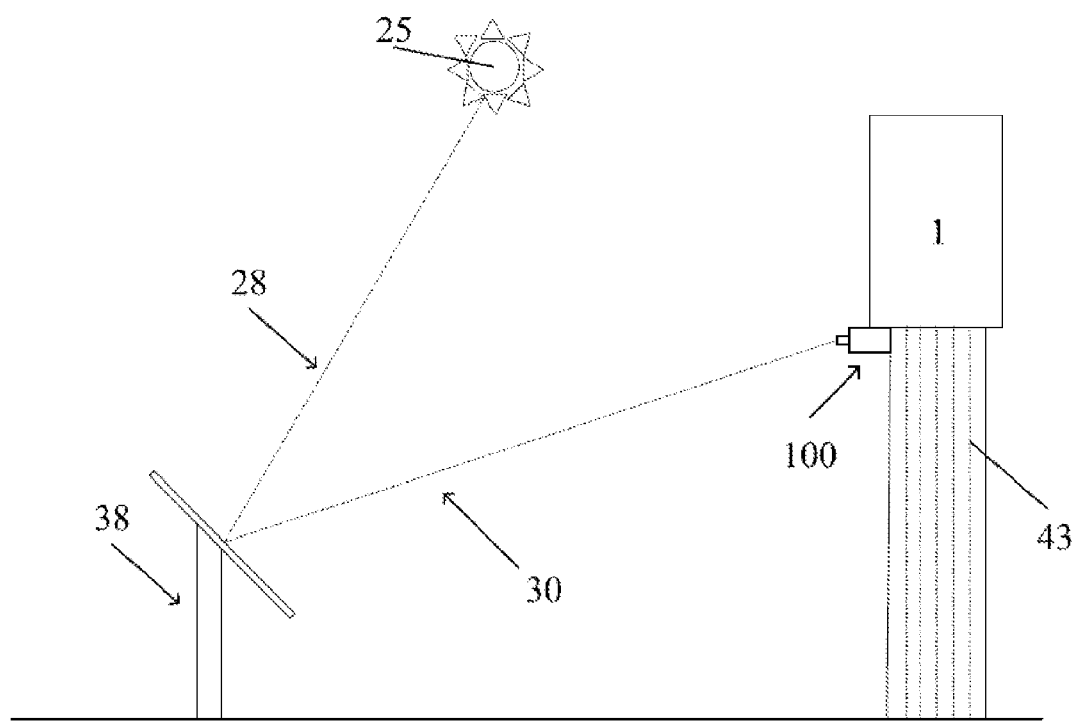
FIGS. 9A-9B are diagrammatic elevation views of a heliostat and a central power tower system equipped with a camera, according to one or more embodiments of the disclosed subject matter.

In the case of a thermal receiver or photovoltaic target, for example, the cameras would optimally be provided just below the receiver on the side of the tower as shown in FIG. 9A. Referring now to FIG. 9A, a receiver 1 sits atop a tower 43, similar to the arrangement of FIG. 1. At least one heliostat 38 is configured with tracking and pivoting means as described above to reflect sunlight 28 onto the receiver 1. A camera 100 is positioned on the tower 43 below the receiver 1 so that a heliostat 38 can also track to the camera 100 and reflect sunlight 28 onto the camera 100. Reflected light 30 is reflected to the camera in accordance with tracking instructions executed by a heliostat 38 from time to time. The camera 100 can optionally be angled toward the solar field in order to cause light reflected from heliostats to hit the camera at a more desirable angle, if the benefits of such an angling would outweigh additional material, installation and/or maintenance costs.

Figure 9B:
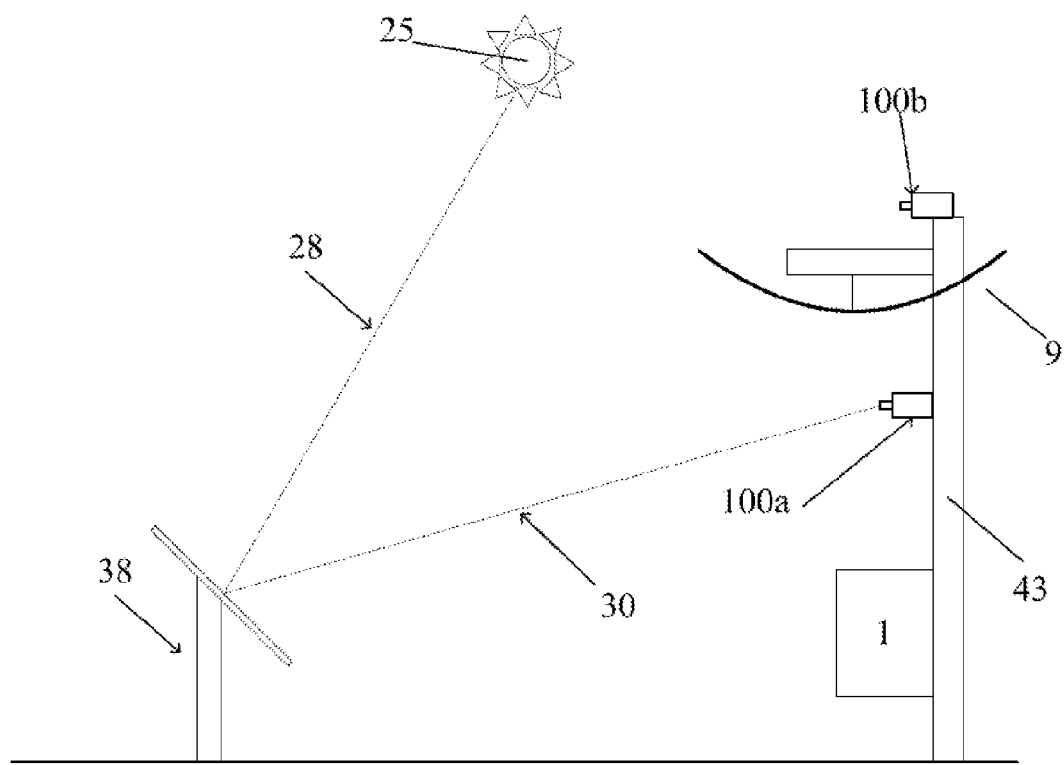

In the case of a secondary reflector used as a 'beam-down' mirror, the cameras could be either above the secondary reflector or on one of the tower supports of the secondary reflector as shown in FIG. 9B. In FIG. 9B, receiver 1 sits on but not at the top of a tower 43 (or alternatively near or at its base) on which is provided a secondary reflector 9, similar to the arrangement of FIG. 2. At least one heliostat 38 is configured with tracking and pivoting means as described above to reflect sunlight onto the secondary reflector 9. A camera 100a is positioned on the tower 43 below the secondary reflector 9 so that a heliostat 38 can also track to the camera 100b. Alternatively, or optionally in addition, a camera 100b is positioned on the tower 43 higher than the secondary reflector 9, in a location allowing a heliostat to track to the camera 100b without the beam being blocked by the receiver at least part of the time.

In a preferred embodiment, the cameras include optical elements to improve the ability of the cameras to detect or measure the light reflected by heliostats. An example of an optical element is a filter that can be placed over the cameras, in order to reduce total or maximum light intensity to a level more appropriate to the sensitivity and/or operating characteristics of the cameras. Other examples of optical elements may include lenses with anti-reflective coatings or dust-repellent coatings, focusing lenses or spectrally selective filters. Alternatively, light intensity may be moderated by software.

Figure 10:
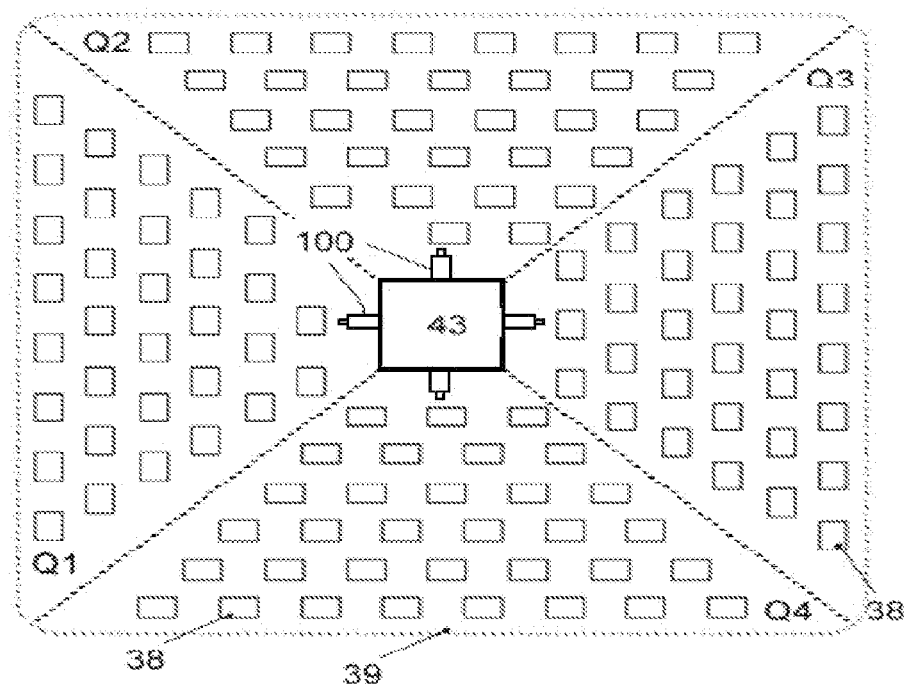
FIG. 10 is a diagrammatic plan view of a solar power tower system showing an example of how a plurality of cameras may be provided to cover a surround heliostat field, according to one or more embodiments of the disclosed subject matter.

In another preferred embodiment, the solar power tower system includes multiple cameras in order to make them accessible to all the heliostats in a solar field. In an example, a solar power tower system includes a surround receiver on a four-sided tower, and additionally includes a surround field of heliostats, i.e., 360° around the tower. In this case the system would include at least one camera, one on each side of the tower. Referring now to FIG. 10, a tower 43 on which a receiver (not shown) is sited is surrounded by a solar field 39 comprising, inter alia, a plurality of heliostats 38 in each of four quadrants Q1, Q2, Q3 and Q4. At least one camera 100, is positioned on the tower such that each of a plurality of cameras 100 can accommodate calibration of the heliostats in one of the four quadrants Q1, Q2, Q3 and Q4.

In other embodiments, a method for operating a solar power tower system includes using a camera to capture the light reflected from a heliostat for the purposes of calibration, where calibration can include at least one of: determining or approximating a statistical distribution of a heliostat's beam project and/or its deviation from a desired or predicted set of values; determining the beam projection shape and/or its deviation from a desired or predicted set of values; determining the flux and/or light intensity at a plurality of points within the beam projection and/or any deviation from a desired or predicted set of values; correcting a structural or assembly error, or shape aberration, or any other malfunction or deviation from design in a heliostat; storing or using any of these data elements for the purpose of updating or changing a database of heliostat-related data or of updating or changing the aiming and/or tracking instructions of a heliostat; or analysis of the data by a system designer or operator. According to the method, the camera is used for calibration of heliostats in a solar power tower system by acquiring an image of each heliostat, or alternatively groups of heliostats, for example once every two weeks, once every month, or once every two months. Therefore, the method preferably includes sending instructions, directly or through a data communications network, to a heliostat to cause it to track to the camera. Alternatively it would be possible to make use of a preprogrammed heliostat controller which causes a heliostat to track to the camera with a desired periodicity or under certain preset conditions. In any of the embodiments, light reflected by the heliostat onto a camera can come from the sun, the moon, or from a light projector.

The method also includes selecting heliostats for tracking to the camera in accordance with their relative availability or, conversely, with in accordance with how much each heliostat is needed by the solar power tower system. For example, it is known that during hours of peak insolation many heliostats are turned away from their usual receiver or other target in order not to overload a receiver or some other system component (such as a turbine in the case of a concentrated solar thermal plant), or so as not to exceed a contractual or regulatory limit (for example the conditions of a power purchasing agreement). It is therefore desirable to select those heliostats not instantly required during such peak insolation hours and instead to cause them to track to the camera at that time. In another example, there may be excess heliostats on one side of a tower; for example, it is known that the heliostats east of a tower in the afternoon (in the northern hemisphere) can reflect up to three times as much light onto the eastern side of a receiver than they can in the morning (because reflected light is reduced in accordance with the cosine of half the angle between incidence and reflection). In accordance with the method it would be desirable to cause such excess heliostats to track to the camera for calibration during such times as they are not needed for energy conversion so as not to make them unavailable at other times when they are more acutely needed (e.g., the morning hours in the eastern field).

Other embodiments relate to a method of calibrating a solar power tower system by reflecting moonlight to a plurality of cameras. A system may comprise a plurality of heliostats which are configured to reflect sunlight to a receiver; a plurality of cameras directed towards the plurality of heliostats which are configured to capture images of at least one of the plurality of heliostats; and a controller which is configured to acquire one or more orientation angles of each of the heliostats for which moonlight is reflected from each of the heliostats to one of the cameras. This may mean that the controller is to determine the orientation angle of the heliostat when the heliostat is reflecting moonlight to the camera.

During the acquisition process, the heliostat may be rotated in a number of different configurations so that the centroid of the reflected moonlight is directed to the camera.

The above system may include a second controller which is configured to estimate at least one geometric parameter for each of the heliostats. In some examples, the estimation may be based at least in part by calculating a new updated set of parameters form the acquired orientation angles and a nominal set of geometric parameters. The nominal parameters may be obtained from the blueprints of the solar plant or alternatively from the previous calibration of the heliostat.

According to other embodiments, the system may further include a tracking controller which is configured to control and rotate the heliostats to reflect sunlight to the receiver based in part on the updated/refreshed set of parameters of the heliostat.

An advantage of performing the calibration process using moonlight is that the calibration of the heliostats may take place at night when the solar plant is not in operation. By calibrating during plant operation, it may be necessary to take heliostats "offline" and therefore they cannot be used to generate steam, i.e., electricity.

It will be appreciated that the methods, processes, and systems described above can be implemented in hardware, hardware programmed by software, software instruction stored on a non-transitory computer readable medium or a combination of the above. For example, the processors described herein can be configured to execute a sequence of programmed instructions stored on a non-transitory computer readable medium. The processors can include, but are not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or storage device which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

Furthermore, the disclosed methods, processes, and/or systems can be implemented by a single processor or by a distributed processor. Further, it should be appreciated that the steps discussed herein can be performed on a single or distributed processor (single and/or multi-core). Also, the methods, processes, and/or systems described in the embodiments above can be distributed across multiple computers or systems or can be co-located in a single processor or system. Exemplary structural embodiment alternatives suitable for implementing the methods, processes, and/or systems described herein are provided below, but not limited thereto.

The methods, processes, and/or systems described herein can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example. Moreover, embodiments of the disclosed methods, processes, and/or systems (e.g., computer program product) can be implemented in software executed on a programmed general purpose computer, a special purpose computer, a microprocessor, or the like.

Embodiments of the disclosed methods, processes, and/or systems (or their sub-components or modules) can be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, etc. In general, any process capable of implementing the functions or steps described herein can be used to implement embodiments of the methods, processes, systems and/or computer program product (software program stored on a non-transitory computer readable medium).

Furthermore, embodiments of the disclosed methods, processes, and/or systems can be readily implemented, fully or partially, in software using, for example, object or object-oriented software development environments that provide portable source code that can be used on a variety of computer platforms. Alternatively, embodiments of the disclosed methods, processes, and/or systems can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the disclosed methods, processes, and/or systems can be implemented in hardware and/or software using any known or later developed systems or structures, devices and/or software by those of ordinary skill in the applicable art from the function description provided herein and with a general basic knowledge of imaging and/or computer programming arts.

Certain features of the disclosed subject matter may sometimes be used to advantage without a corresponding use of the other features. While specific embodiments have been shown and described in detail to illustrate the application of the principles of the invention, it will be understood that the invention may be embodied otherwise without departing from such principles.

It is, thus, apparent that there is provided, in accordance with the present disclosure, systems and methods for the control and calibration of a solar power tower. Many alternatives, modifications, and variations are enabled by the present disclosure. Features of the disclosed embodiments can be combined, rearranged, omitted, etc., within the scope of the invention to produce additional embodiments. Accordingly, Applicants intend to embrace all such alternatives, modifications, equivalents, and variations that are within the spirit and scope of the present invention.

The invention claimed is:
1. A solar energy collection system comprising:
   a plurality of heliostats configured to reflect sunlight to a target mounted on a tower;
   a plurality of heliostat controllers, each controller corresponding to and controlling a respective one of the plurality of heliostats;

a plurality of cameras oriented to image the plurality of heliostats, the heliostat controllers being configured to control their respective heliostats such that sunlight reflected therefrom is directed to at least one of the plurality of cameras; and a second controller which is configured to:
compute geometry data that defines a geometry of the surface of one of the plurality of heliostats from captured images thereof, the geometry data designating a plurality of subsections of the surface, the computing including storing data indicating sections of the captured images corresponding to the plurality of subsections of the one of the plurality of heliostats; and calculate data indicating respective surface normals of each of said subsections of said one of the plurality of heliostats.

2. The system of claim 1, wherein the plurality of cameras are mounted on a tower.

3. The system of claim 2, wherein the plurality of cameras and the target are mounted on the same tower.

4. The system of claim 1, wherein the plurality of cameras are configured to capture images of the plurality of heliostats.

5. The system of claim 1, wherein the at least one of the plurality of cameras captures at least two images of said one of the plurality of heliostats.

6. The system of claim 5, wherein for each additional image, the corresponding heliostat controller controls said one of the plurality of heliostats to shift to a different position.

7. The system of claim 6, wherein the heliostat controllers are configured to shift their corresponding heliostats an angular distance of approximately 1.25 milliradian in the elevation axis and/or approximately 1.25 milliradian in the azimuth axis.

8. The system of claim 1, wherein the plurality of cameras further comprises at least one of a heat shield and an optical filter.

9. The system of claim 1, wherein each pixel of the captured image defines a different subsection of the plurality of subsections.

10. The system of claim 1, wherein the second controller is configured to estimate at least one geometric parameter which is common for each subsection of said one of the plurality of heliostats based at least in part on the calculated surface normal of each subsection.

11. The system of claim 10, wherein the second controller is configured to estimate at least one geometric parameter which is common for each subsection of said one of the plurality of heliostats based at least in part on the calculated surface normal of each subsection and at least one nominal geometric parameter of said one of the plurality of heliostats.

12. A method of operating a solar energy collection system comprising:
at first times:
(a1) controlling a plurality of heliostats to reflect sunlight to a receiver, the receiver being mounted on a tower;

at second times, different from said first times:
(b1) controlling at least one heliostat of the plurality of heliostats to reflect sunlight to a camera;
(b2) acquiring multiple images of said at least one heliostat;
(b3) subdividing each image of the multiple images into a plurality of subsections, and calculating corresponding data indicating an assignment of each subsection of the plurality of subsections to a specific area of the at least one heliostat; and
(b4) calculating geometry data indicating a surface normal for each specific area of the at least one heliostat responsively to the multiple images.

13. The method of claim 12, wherein the step (b2) of acquiring multiple images comprises shifting the at least one heliostat an angular distance of approximately 1.25 milliradian in the elevation axis and/or approximately 1.25 milliradian in the azimuth axis and acquiring an image after each directional shift.

14. The method of claim 12, further comprising, estimating at least one geometric parameter which is common for each specific area of the at least one heliostat of the plurality of heliostats responsively to the surface normal of each specific area.

15. The method of claim 14, further comprising, orienting the at least one heliostat to reflect sunlight to the receiver responsively to the at least one geometric parameter.

16. The method of claim 15, wherein the step of estimating is further based on a nominal geometric parameter of the at least one heliostat.

17. The method of claim 12, wherein a shape of the at least one heliostat is calculated based on the calculated geometry data.

18. A method for controlling a solar energy collection system, comprising:
capturing an image of a first heliostat of a plurality of heliostats;
subdividing the image into a plurality of subsections, and calculating corresponding data indicating an assignment of each subsection of the plurality of subsections to a specific area of the first heliostat;
calculating the surface normal of each specific area of the first heliostat; and
calculating the solar flux distribution on an external face of a tower-based receiver based at least in part on the calculating the surface normal of each specific area of the first heliostat.

19. The method of claim 18, further comprising directing the first heliostat of a plurality of heliostats to reflect incoming solar radiation onto aiming points on the external surface of the receiver based at least in part on the calculating of the solar flux distribution.

20. The method of claim 18, wherein the step of calculating the solar flux further comprises estimating the shape of the beam reflected from the heliostat onto the external surface of the receiver.

* * * * *